July 19, 1932.   D. VALSTAR   1,868,035
DEVICE FOR TRIMMING COAL AND LIKE MATERIAL IN SHIPS
Filed Sept. 6, 1930   3 Sheets-Sheet 3

Inventor
Dirk Valstar
By Attorneys
Nathan & Bowman

Patented July 19, 1932

1,868,035

UNITED STATES PATENT OFFICE

DIRK VALSTAR, OF ROTTERDAM, NETHERLANDS

DEVICE FOR TRIMMING COAL AND LIKE MATERIAL IN SHIPS

Application filed September 6, 1930, Serial No. 480,114, and in the Netherlands October 19, 1929.

The present invention has reference to loading apparatus for trimming and spreading coal and like loose and other materials, in ships, and other places.

When used in connection with ships or boats the apparatus is adapted to be attached to the sides of a hatch-way or hatch coaming.

Loading apparatus has been proposed in which the coal is led by a hopper or conveyer on to a rapidly rotating roller, which projects the coal with some force. If pieces of coals are treated in this way they are greatly reduced in size and even partly pulverized, which is a very undesirable feature. According to another device, there is provided telescoping parts, of which the last one is provided at its end with a tool. With this arrangement breaking-up of the coal does not occur to such a degree, but the amount of work done in a certain time is much less, as the projecting device must be stopped whilst the feeding of coal takes place. Hence the working efficiency of the apparatus is low.

By the present invention there is provided a trimming and spreading apparatus in which the coal is not broken up or pulverized and which is adapted to work continuously.

According to the present invention there is provided loading apparatus for trimming and spreading coal and like or other material having a feed hopper rotatable in a frame, means which may be adjustable, such as hooks or rollers running on guide-ways, on said frame, for attaching the apparatus to a hatch-way or the like, the material being discharged from the hopper to a conveying device.

The conveying device may, according to the present invention, be in the form of a traveller, for example it may consist of a conveying belt hinged at one or several points, which can be run in and out and can be folded and further arranged in such a manner, that in each position of the belt, the material can be conveyed out of the hopper. The belt may be, if desired, drawn entirely within the frame.

In an exemplary construction the frame may be so arranged that the hopper is allowed to rotate freely no matter how high the material is accumulated against the back-wall.

The accompanying drawings show a constructional example of the improved loading apparatus.

Figure 1:
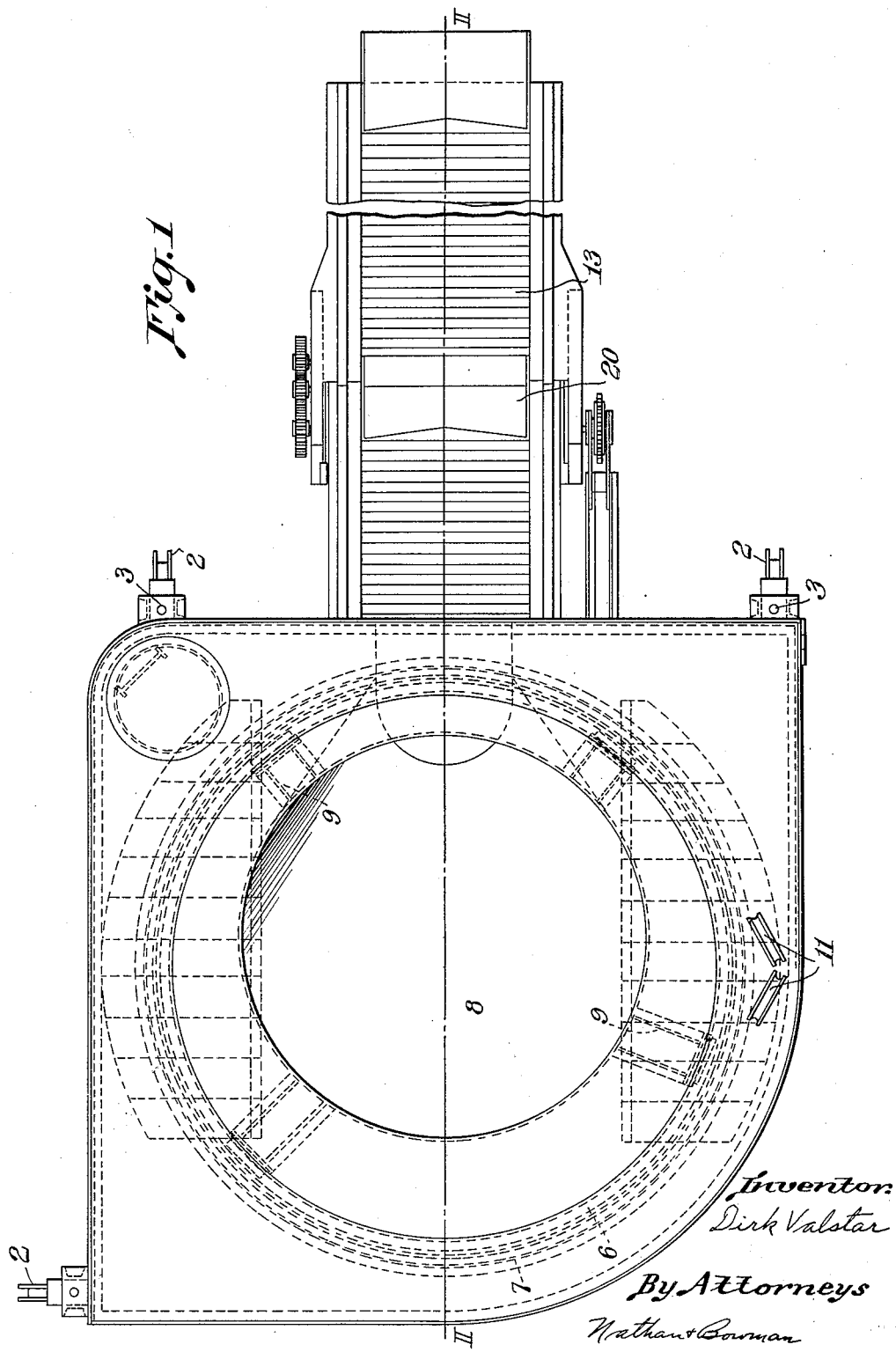
Fig. 1 is a plan view of the apparatus with its traveller or conveying belt run out or extended.
Figure 2:
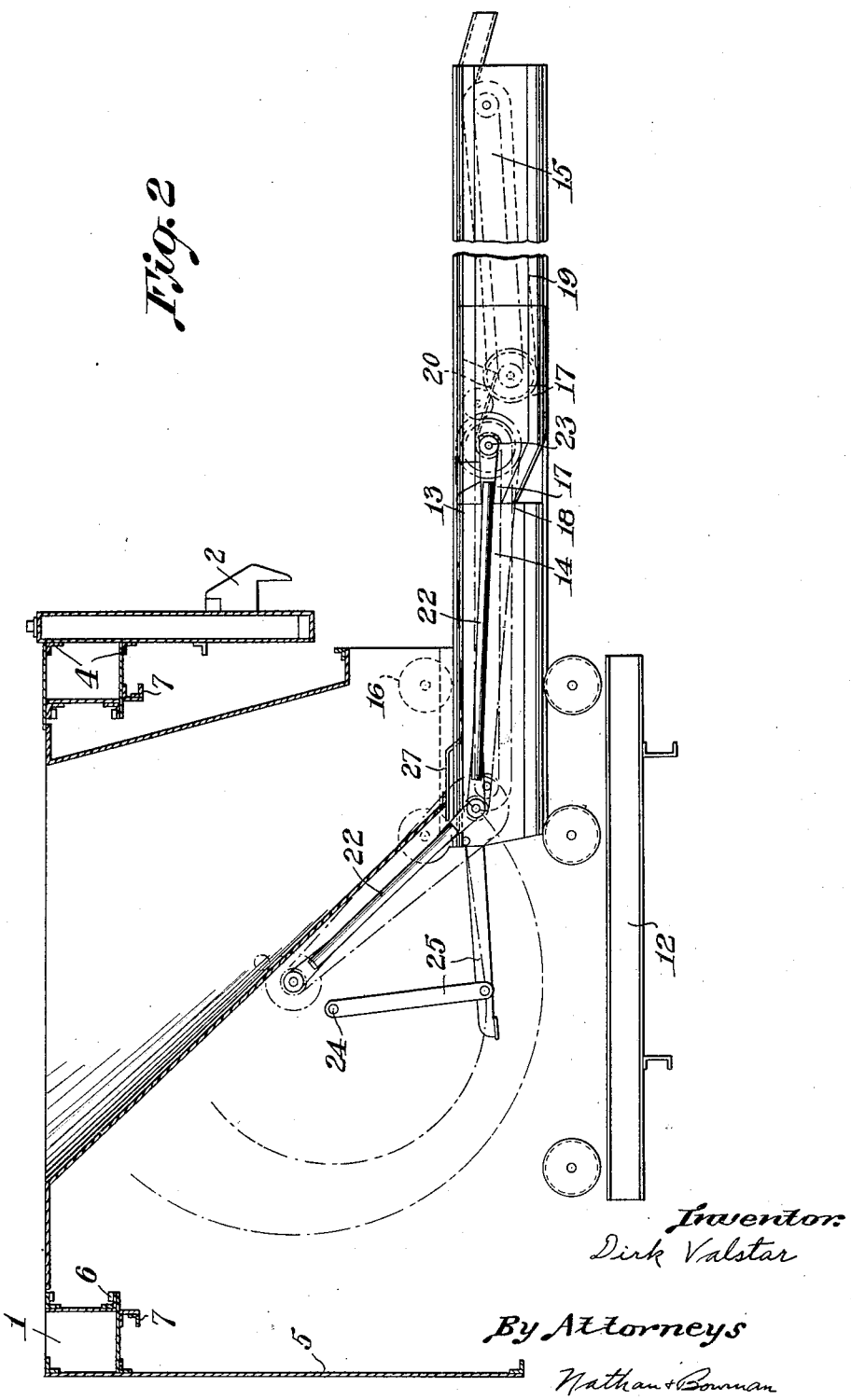
Fig. 2 is a section taken over the line II—II of Fig. 1.
Figure 3:
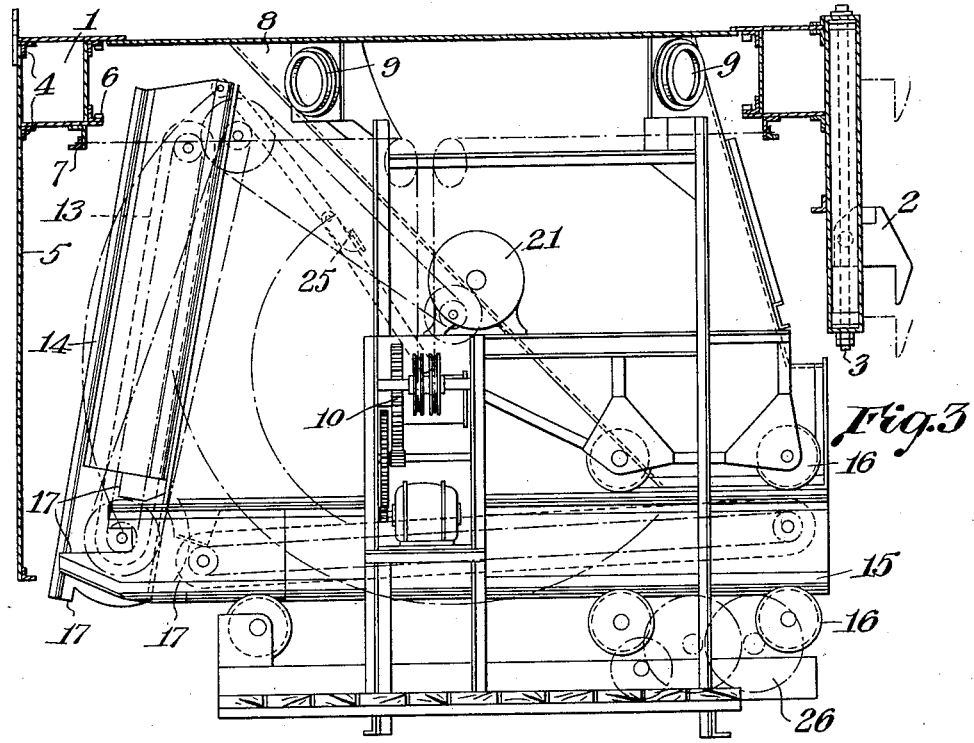
Fig. 3 is a view, partly in section corresponding to Fig. 2, but with the conveying belt entirely drawn into the frame, and Fig. 4 a front view.
Figure 4:
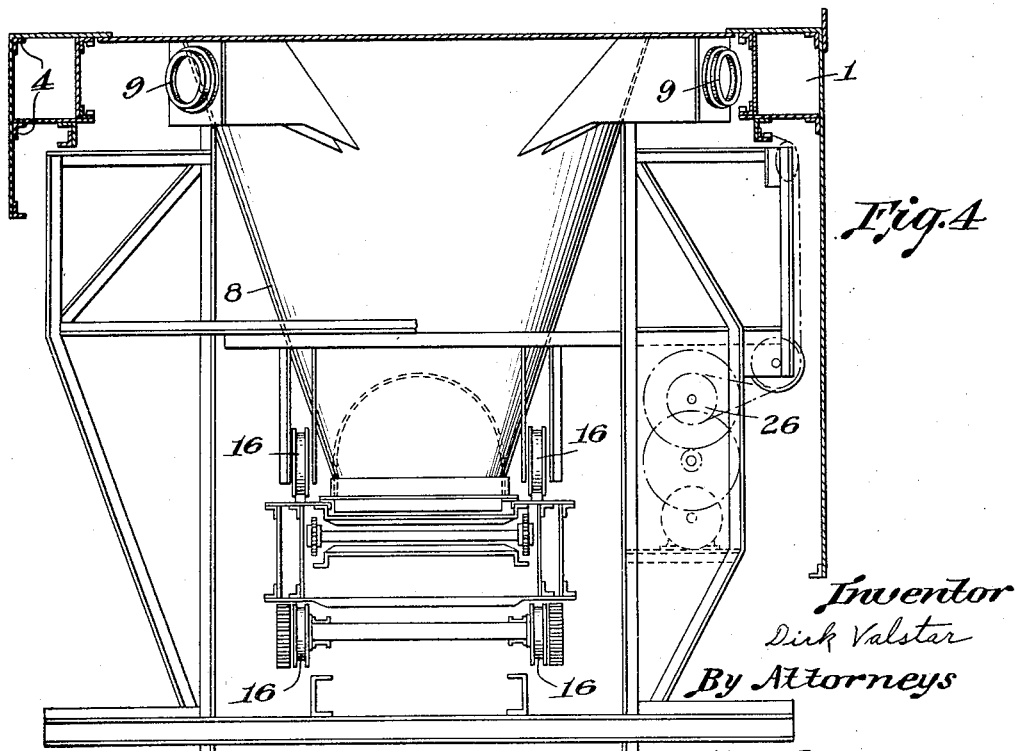

The apparatus consists of three parts, the fixed frame, the feeding hopper, and the traveller or conveying belt, which will be described in succession.

The fixed frame 1, which is provided with a suitable feed opening, is fitted with a plurality of hooks 2, by means of which the apparatus can be attached, for example, to a hatchway or hatch coaming, or to between-deckbeams, or some other suitable structure. Rollers running on rails may be employed also. These hooks or rollers are adjustable in a vertical direction by means of threaded rods 3. The frame is composed of beams 4 and a back wall 5 and is provided with rails 6 and a rim 7 for the rotatable hopper 8. The hopper 8 has a number of rollers 9 running on the rails 6 and may be rotated by means of a winch 10. A cable runs for this purpose from the winch over the guiding rollers 11 and in the rim 7. By winding up the cable in one or the other direction the hopper may be rotated with respect to the frame 1.

Beneath and to the side of the hopper there is a frame 12 serving to support the conveying belt and its driving mechanism. This conveying belt 13 consists of a two-part frame 14, 15, the top and the undersides of which are provided with rails for cooperating with supporting rollers 16 attached to the frame 12. At the hinge joint between the parts 14 and 15 there are supporting surfaces 17, by means of which the outer part 15 is supported by the other one when the conveyer is extended. Each part has a separate belt 18, 19, with upright edges, running on rollers and between which is a bridge plate 20. If desired one single continuous belt may be used. The driving of the belts is effected by means of a motor 21 which actuates a shaft 23 by means of chain wheels mounted on hinged rods 22 for driving the belt 19, whilst the other belt is moved by an intermediate shaft. The shaft 23 serves also as a hinge between the frame parts 14 and 15 of the traveller. When the conveying belt or traveller is being withdrawn, the frame part 14 is led in its turning movement by means of a two-part rod 25, rotatable about a fixed axis 24. The extension and retraction or running in and out of the conveying belt or traveller is done by means of a winch 26. The discharge opening of the hopper may be provided with a regulating slide 27.

When the apparatus is to be used it is positioned with the conveying belt or traveller housed in the frame, in, for example, a hatchway and attached or suspended by means of the hooks or rollers 2 to the beams of the hatch It is to be understood the apparatus is suited for use at any convenient place.

The height at which the device is placed may be changed during work. It is also possible to incline the device forward or backward by adjusting or placing the hooks 2 at different heights.

To commence feeding and trimming the traveller or conveyer is run out and put in motion by means of the motor 21, and the material is dropped or fed continuously into the hopper 8. By turning the hopper by means of the winch 10 and withdrawing the belt more or less, the coal may be spread over the hold in such a manner that loading operations are facilitated and moreover the material, such as coal, is not broken up, nor pulverized.

What I claim is:

1. An apparatus for trimming and spreading granulous material in the hold of a ship combining a frame member adapted to be positioned adjacent the hatchway of a vessel; a hopper member carried by said frame and having its discharge end located below the hatchway; distributing mechanism carried by said frame for conveying the material delivered by the said hopper to places in said hold remote from the hatchway, said distributing mechanism comprising a multipart hinged conveyor arranged to be foldable within said frame member or extensible laterally therefrom; and means for extending one or more of said sections laterally beyond said frame member.

2. An apparatus for storing coal or other material in the hold of a vessel combining a frame member insertable in the hatchway of the vessel; a distributing mechanism supported by said frame comprising conveyor belts and supports therefor, said supports being hinged together and adapted to be folded and housed within said frame when inserting or removing same from the hold; means for projecting one or more of said conveyor belts laterally of said frame a predetermined distance; and a hopper member carried by said frame and having its discharge end adjacent said distributing mechanism for feeding the material thereto in any adjusted position thereof.

3. An apparatus for trimming and spreading material in bulk in the hold of a ship combining a rotatable hopper member adapted to be positioned over the hatchway of a vessel and having its discharge end depending into the hold; distributing mechanism rotatable with said hopper for conveying the material delivered at the discharge end of said hopper to places remote from the hatchway, said distributing mechanism comprising a two-section hinged conveyor arranged to be foldable in a single plane and adjustably mounted adjacent the discharge end of said hopper; and means for adjusting the delivery end of said conveyor radially of said hopper.

4. An apparatus for trimming and spreading material in bulk in the hold of a ship combining a vertically adjustable and rotatable hopper member adapted to be positioned over the hatchway of a vessel and having its discharge end depending into the hold; aligned cooperating conveyor belts extensibly mounted adjacent the discharge end of said hopper and movable therewith; means for actuating said conveyor belts; and means for adjusting the delivery end of said conveyor belt radially and angularly in various positions of elevation of said hopper for depositing the material conveyed thereby to various localities in the hold of the vessel.

5. An apparatus for storing coal or other like material in the hold of a vessel combining a frame member insertable in the hatchway of a vessel; a hopper member supported by said frame; distributing mechanism supported by said frame and located adjacent the discharge end of said hopper, said mechanism comprising a plurality of aligned cooperating conveyors adapted to be foldable within said frame member; and means for extending one of said conveyors beyond said frame member.

In testimony whereof I have signed my name to this specification.

DIRK VALSTAR.